United States Patent
Reich et al.

(10) Patent No.: US 11,030,232 B1
(45) Date of Patent: *Jun. 8, 2021

(54) SYSTEM AND METHOD FOR MANAGING REGULATORY INFORMATION

(71) Applicant: Veeva Systems Inc., Pleasanton, CA (US)

(72) Inventors: Uri Reich, Hamden, CT (US); Sandra Komadinic, Hamilton (CA); Richard Merrick, Dresher, PA (US); Rolando Sa, Lebanon, NJ (US); Katharyn Wilber, Philadelphia, PA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,425

(22) Filed: Dec. 9, 2019

Related U.S. Application Data

(63) Continuation-in-part of application No. 15/494,337, filed on Apr. 21, 2017.

(51) Int. Cl.
*G06F 16/332* (2019.01)
*G06F 16/38* (2019.01)
(Continued)

(52) U.S. Cl.
CPC .......... *G06F 16/38* (2019.01); *G06F 16/168* (2019.01); *G06F 16/332* (2019.01);
(Continued)

(58) Field of Classification Search
CPC ...... G06F 16/38; G06F 16/332; G06F 21/105; G06F 16/3331; G06F 16/168; G06F 21/6245
See application file for complete search history.

(56) References Cited

U.S. PATENT DOCUMENTS

| | | |
|---|---|---|
| 6,205,455 B1 | 3/2001 | Umen |
| 2003/0036947 A1* | 2/2003 | Smith ................ G06Q 10/101 705/300 |

(Continued)

OTHER PUBLICATIONS

Viegas et. al. "From submit to submitted via submission: on lexical rules in large-scale lexicon acquisition", ACL '96: Proceedings of teh 34th Annual Meeting on Assciation for Computational Linguistics, pp. 32-39 (Year: 1996).*

(Continued)

*Primary Examiner* — Mark D Featherstone
*Assistant Examiner* — Kweku William Halm

(57) ABSTRACT

Systems and methods for managing regulatory information. The system comprises a submission controller, a registration controller and a submission archive controller. The submission controller may manage a submission structure, and allow users to search for documents in a content management system and add the documents to the submission structure. The registration controller may manage product registration information and health authority interactions globally, and capture, view and take actions upon product registrations. The submission archive controller may allow users to access a complete history of regulatory submissions and correspondence globally, with an easy to use interface. The three controllers reside in a single system that allows them to interact seamlessly with each other.

18 Claims, 15 Drawing Sheets

(51) Int. Cl.
*G06F 21/10* (2013.01)
*G06F 16/16* (2019.01)
*G06F 21/62* (2013.01)
*G06F 16/33* (2019.01)

(52) U.S. Cl.
CPC ........ *G06F 16/3331* (2019.01); *G06F 21/105* (2013.01); *G06F 21/6245* (2013.01)

(56) References Cited

U.S. PATENT DOCUMENTS

| | | |
|---|---|---|
| 2006/0265508 A1 | 11/2006 | Angel |
| 2007/0192715 A1 | 8/2007 | Kataria |
| 2007/0198477 A1* | 8/2007 | Lawton ................ G06F 19/326 |
| 2011/0106714 A1 | 5/2011 | Junger |
| 2013/0198094 A1* | 8/2013 | Arazy ................... G06Q 50/18 |
| | | 705/317 |
| 2014/0172513 A1 | 6/2014 | MacLean |
| 2015/0324550 A1 | 11/2015 | Hurley |
| 2018/0121551 A1 | 5/2018 | Krasadakis et al. |
| 2019/0259038 A1* | 8/2019 | Papa ................... G06F 16/9535 |

OTHER PUBLICATIONS

Ferilli et al., "Hi-Fi HTML Rendering of Multi-format Documents in DoMInUS" pp. 173-176 (Year: 2013).
Google Search (Year: 2016) https://patents.google.com/?q=incorporating+documents+documents&oq=incorporating+documents+within+documents.

* cited by examiner

VIEWS
- All Structure
- Recent Structure
- My Structure
- Favorites

FILTERS

PRODUCT
- All
- Coldcap
- R

DOCUMENT TYPES
-

STATUS
- All
- Draft
- Planned
- In Approval
- In Review

Search

[Library] [Tasks] [Submission Structure] [Reports] [Dashboard]

NDA 8700    [Binding] [Add]

[Search Current Binder]

☐ 1. Administrative Information
☐ 2. Common Technical Document Summaries
    2.2 Introduction
    2.3 Quality Overall Summary
    2.4 Nonclinical Overview
    2.5 Clinical Overview
       - Clinical Overview 12345
    2.6 Clinical Summary
☐ 3. Quality
☐ 4. Nonclinical Study Reports
☐ 5. Clinical Study reports

| Registration | Application | Products | Submission Structure | Reports | Dashboard |

Search

VIEWS
All Registrations
Recent Registration

FILTERS
- Country
- Pharmaceutical Product

| Registrations or License No. | Country | Registration Status | Product | Presentation |
|---|---|---|---|---|
| AU Coldcap 390 | Australia | Planned | Coldcap | 15mg with 8ml diluent |
| BR Coldcap 125 | Brazil | Marketed | Coldcap | 15mg with 8ml diluent |

| Search | | | | |
|---|---|---|---|---|
| Registration | Application | Products | Submission Structure | Reports | Dashboard |

What is it Registered?

| Registrations or License No. | Registration Holder | Registration Status | Registration Status Date | Application No. | Product Name | Product Detail | Manufacturer Dosage Form |
|---|---|---|---|---|---|---|---|
| AU Coldcap 390 | | Planned | 1/5 | 089 | Coldcap | 15mg with 8ml diluent | |
| BR Coldcap 125 | | Marketed | 2/2 | 121 | Coldcap | 15mg with 8ml diluent | |

| Registration | Application | Products | Library | Viewer | Tasks | Dashboard | Reports | Loader |

Search

Application Selector

SubmissionArchive Viewer NDA 3001 Submissions

☐ Module 1 Administrative Information
☐ Module 2 Summaries
   ☐ 2.2 Introduction to summary
   ☐ 2.3 Quality Overall Summary
      ☐ Introduction
      ☐ Introduction to Quality Overall Summary
      ☐ Drug Substance
         ☐ TC03-doc-1 Original
         ☐ TC03-doc1-Appendant1-Replacement
☐ Module 3 Quality
☐ Module 4 Nonclinical Study Reports
☐ Module 5 Clinical Study Reports

1101

TC03-doc-1-Appendant1-Replacement
Title: TC03-doc-1-Appendant1-Replacement
ID: ID303
Operation: Replace
Modified File:
Xlink Type: Simple
Checksum Type:
Checksum:
Substance:
Manufacturer:

VIEWS
- All Submissions

FILTERS
- Submission ID
- Submission Type
  - All
  - Original Application
  - Annual Report

FIG. 11

Impacted Documents Report

FILTERS (3)

Expand all   Collapse all

Documents (6)

| Name | Status | Type | Submission Activity (2) | | | Registration (2) | | |
|---|---|---|---|---|---|---|---|---|
| | | | Name | Description | Status | Name | Country | Status |
| 3.2.P.5.1 Specifications (v2.0) | Superseded | Quality > Control of Drug Product | Initial MAA for Vodavir EU | Initial MAA | Approved | EMA/H/C/000/0024 | European Union | Approved |
| 3.2.P.5.1 Specifications (v3.0) | Superseded | Quality > Control of Drug Product | Type II Variation - Updated Spec for Vodavir manuf | Updated spec for manufacturing process for vodavir 100mg and 200mg | Approved | EMA/H/C/000/0023 | European Union | Approved |
| 3.2.P.5.1 Specifications (v4.0) | Approved | Quality > Control of Drug Product | Type II Variation - Updated Spec for Vodavir manuf | Updated spec for manufacturing process for vodavir 100mg and 200mg | Approved | EMA/H/C/000/0023 | European Union | Approved |

SYSTEM AND METHOD FOR MANAGING REGULATORY INFORMATION

CROSS-REFERENCE TO RELATED APPLICATION

The present application is a continuation-in-part of U.S. nonprovisional patent application Ser. No. 15/494,337, filed on Apr. 21, 2017, entitled System and Method for Managing Regulatory Information, which is hereby incorporated by reference herein for all purposes.

BACKGROUND

The subject technology relates generally to content management systems, and more particularly to managing regulatory information.

Regulatory information management (RIM) has become a major focus among pharmaceutical companies, since it is important to meet their regulatory and compliance obligations, and improve their business processes and productivity across the global. For a pharmaceutical company, the regulatory information may include, e.g., safety reporting, product registrations, central and local requirements, submissions to health authorities, and health authority information management. However, regulatory information is traditionally captured in a multitude of disconnected central and local systems, which creates redundancies and duplication of efforts worldwide.

SUMMARY

The disclosed subject matter relates to a system for managing regulatory documents. The system comprises a submission controller for generating a submission user interface which comprises a first area for receiving a first query for a first document, a second area for receiving a request for a submission structure for a first submission, a third area for receiving a request for a first task, and a fourth area for displaying a search result in response to the first query. The submission controller may further: in response to a request for a submission structure, display the submission structure for the first submission, wherein the submission structure for the first submission comprises a hierarchy of documentation of the first submission. The submission controller may further: in response to the first query, search a content and data management system for the first document, and display a search result in the fourth area. The submission controller may further: in response to a request for adding the first document to the submission structure for the first submission, add the first document to the submission structure.

BRIEF DESCRIPTION OF THE DRAWINGS

FIG. 7 illustrates an example submission structure user interface according to one embodiment of the present invention.

FIG. 9 illustrates an example registration user interface according to one embodiment of the present invention.

FIG. 10 illustrates an example registration report user interface according to one embodiment of the present invention.

FIG. 11 illustrates an example submission archive user interface according to one embodiment of the present invention.

FIG. 14 illustrates a status report for managing document variations in submissions with the regulatory information management architecture according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
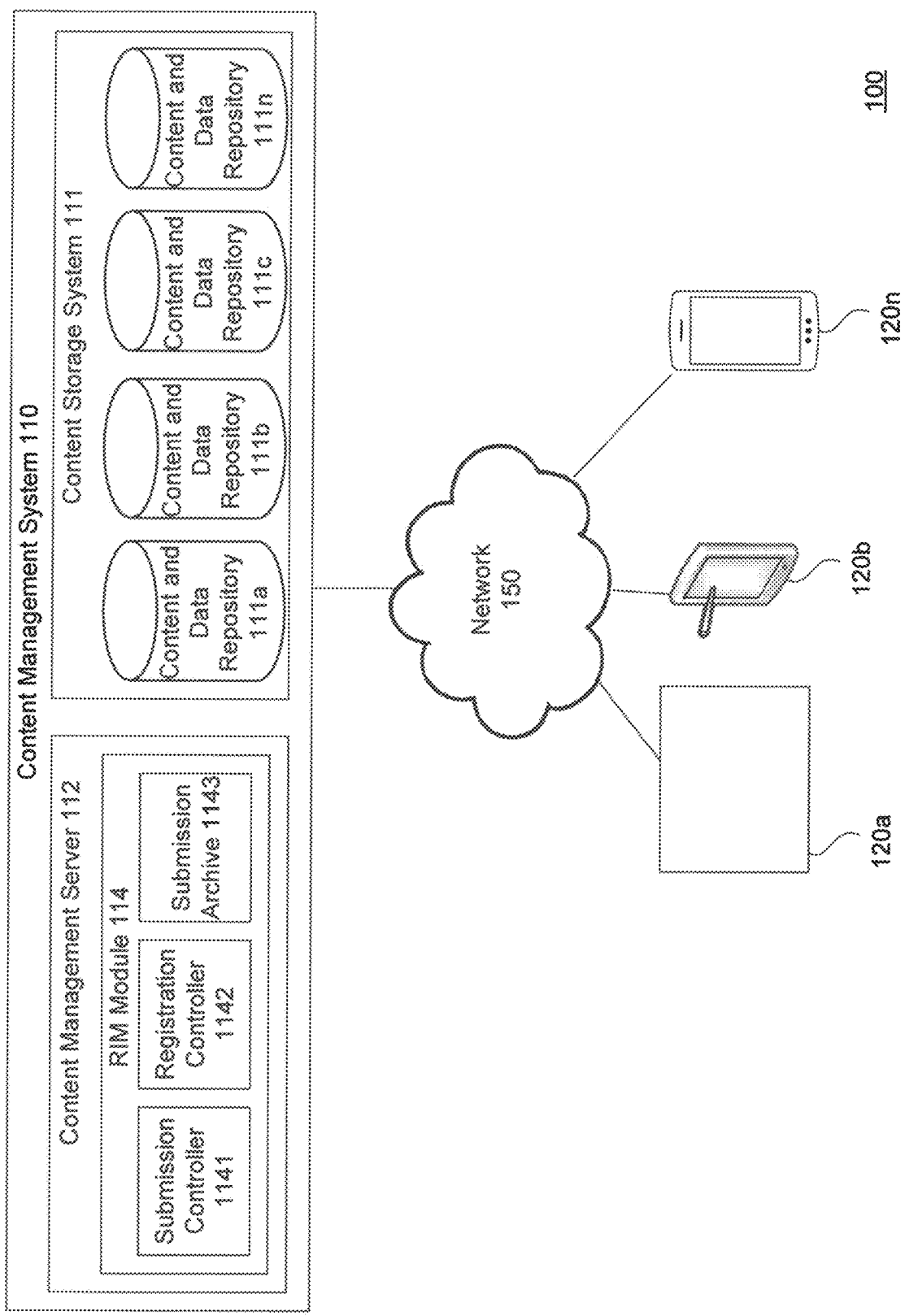
FIG. 1 illustrates an example high level block diagram of a regulatory information management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, ... 120n, coupled to each other via a network 150. The content management system 110 may include a content storage system 111 and a content management server 112. The content storage system 111 may have one or more content and data repositories, e.g., 111a, 111b, 111c, and 111n. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content management server 112 is typically a remote computer system accessible over a remote or local network, such as the network 150. The content management server 112 may include a regulatory information management module 114. The regulatory information management module 114 may have a submission controller 1141, a registration controller 1142 and a submission archive controller 1143, which will be described in detail with reference to FIG. 3.

The content storage system 111 may store content that user computing devices 120a-120n may access. Each content repository (e.g., 111a, 111b, 111c or 111n) may store a specific category of content, and allow users to interact with its content in a specific business context.

In one implementation, the repository 111a may store a submissions library for regulatory content related to submissions, which may include information and submissible documents and data for the generation of submission structures, and the planning, authoring and collection of required documents. Within the submissions library, users may quickly find information they are looking for through search and filtering. The user may find drug documentation related to a product or a geographic region. The repository 111a may also store information about review and approval flow, status of documents and a filing, and dashboard reports, giving users the ability to manage the overall process.

In one implementation, the repository 111a may also store regulatory information related to product registration, which may include product registration information and health authority interactions. The product registration information may include, e.g., the associated product information, application information, application date, registration details, key registration dates, marketing status, and marketing details. In one example, the user may see all the global registrations and their status in one report. The health authority interactions may include bidirectional interactions with health authorities globally, including correspondence, commitments and queries.

In one implementation, the repository 111a may also store information for a submission archive, which may include a customer's complete global history of regulatory submissions and correspondence.

In one implementation, the repository 111a may also store source documents for the regulatory information management system.

Although the submissions library, regulatory information related to product registration, submission archive, and source documents for the regulatory information management system are shown to be stored in one repository, it should be understood that they might be stored in multiple repositories.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
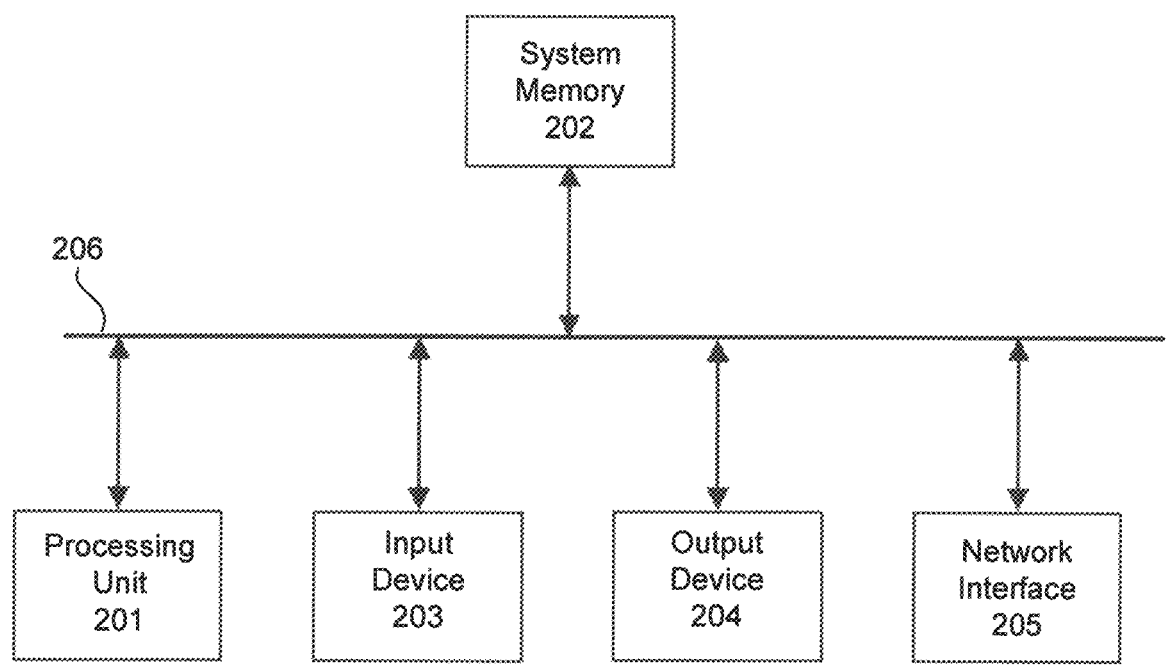
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
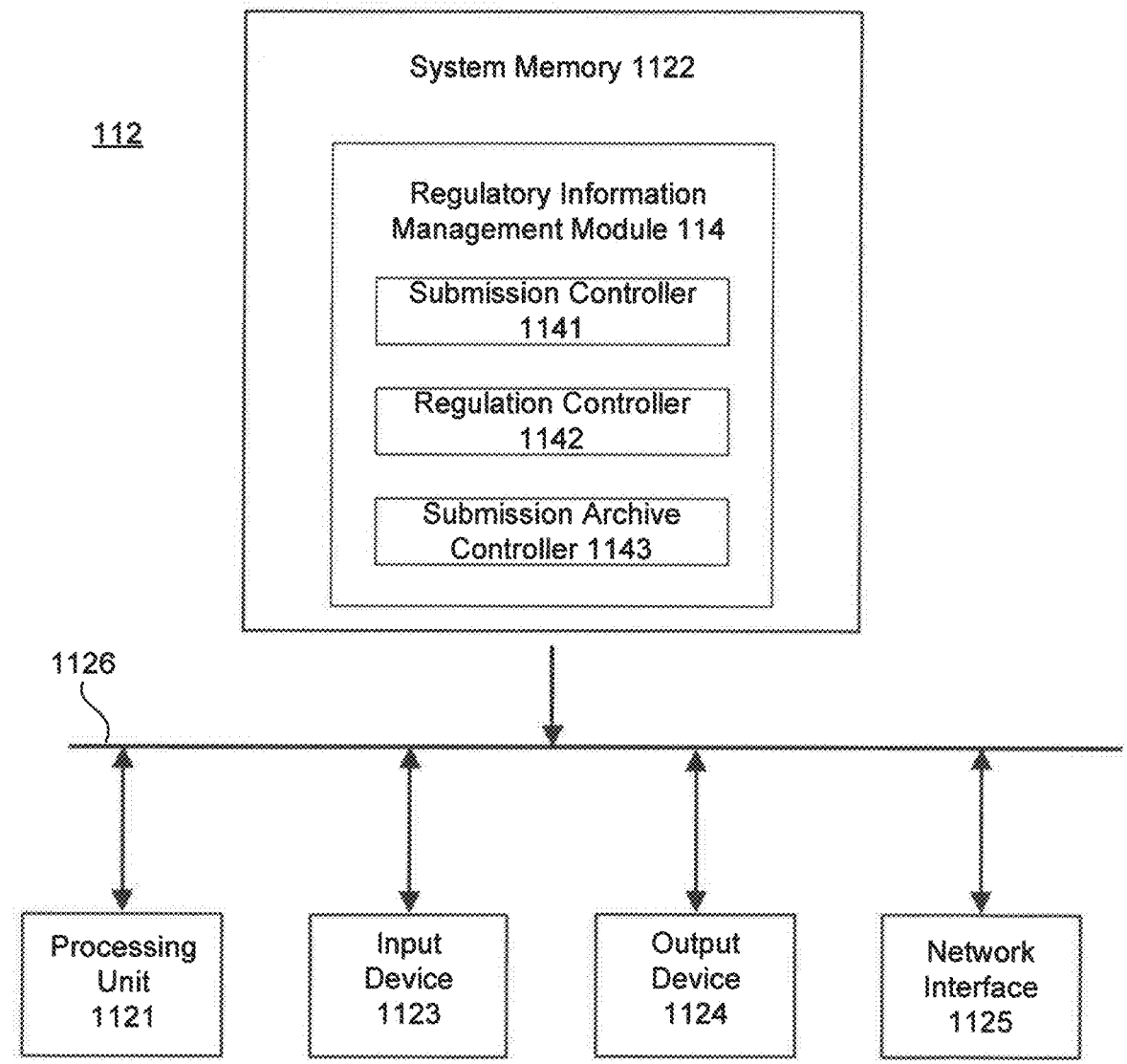
FIG. 3 illustrates an example high level block diagram of the content management server according to one embodiment of the present invention.
Figure 4:
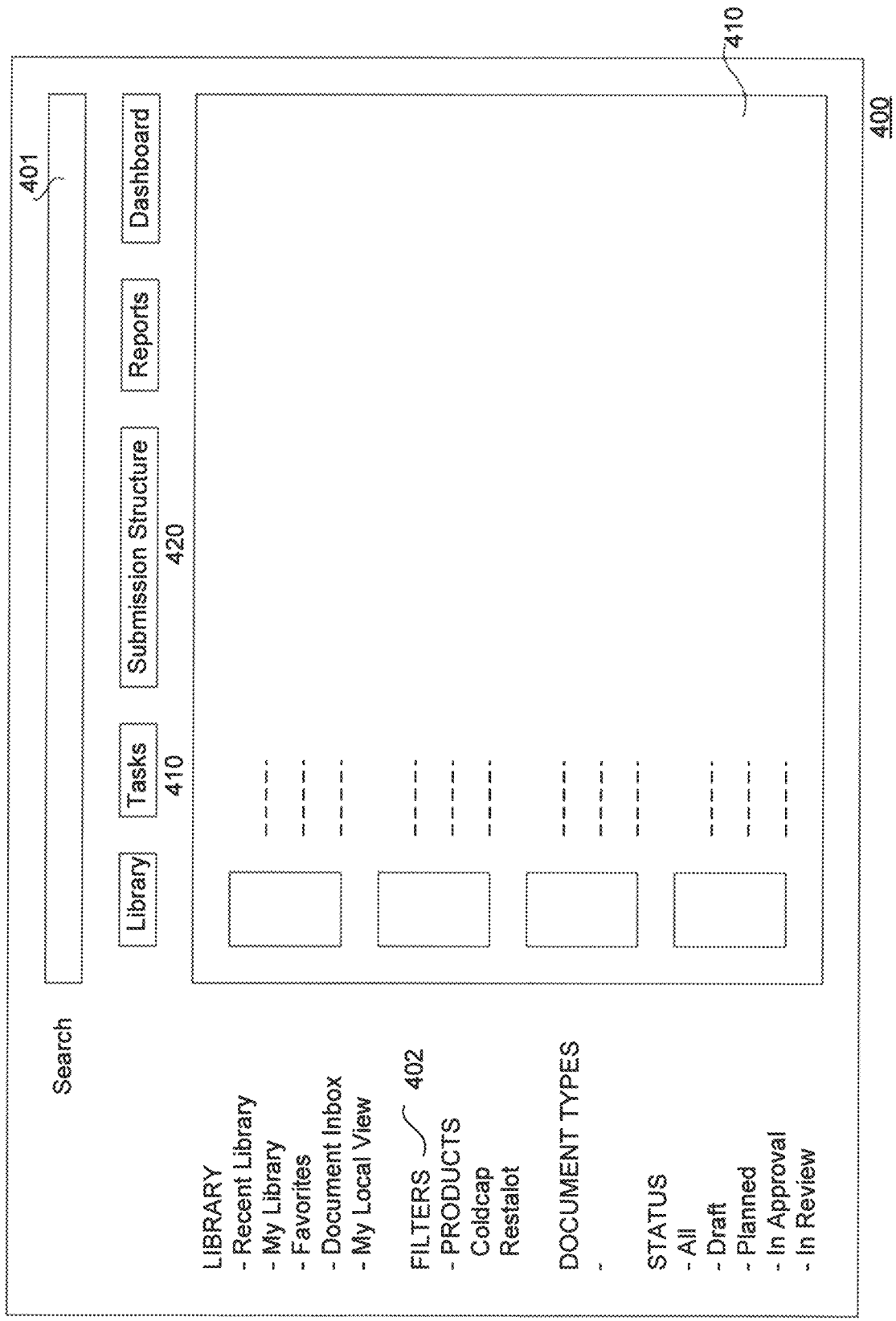
FIG. 4 illustrates an example submission user interface according to one embodiment of the present invention.
Figure 5:
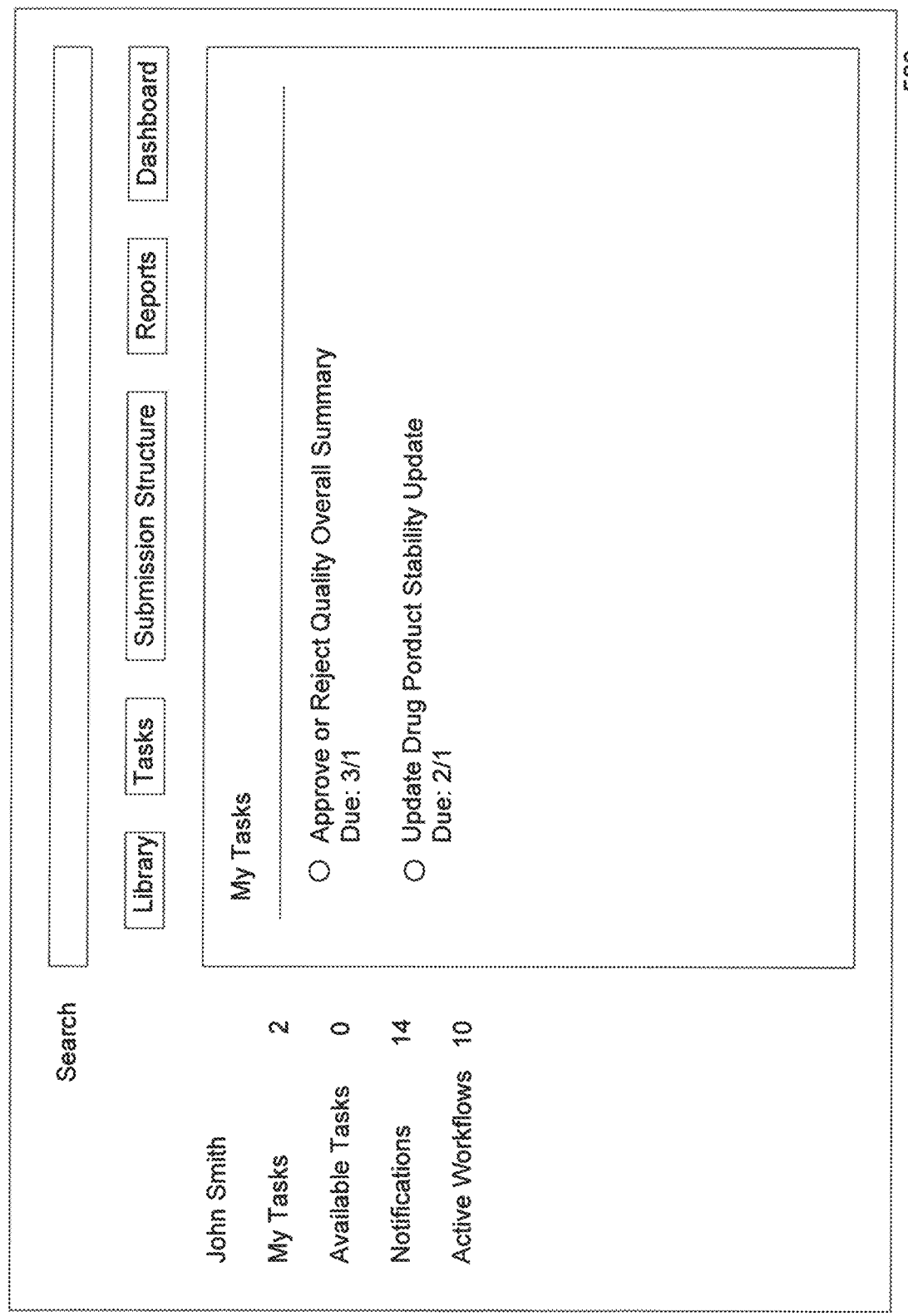
FIG. 5 illustrates an example task user interface according to one embodiment of the present invention.
Figure 6:
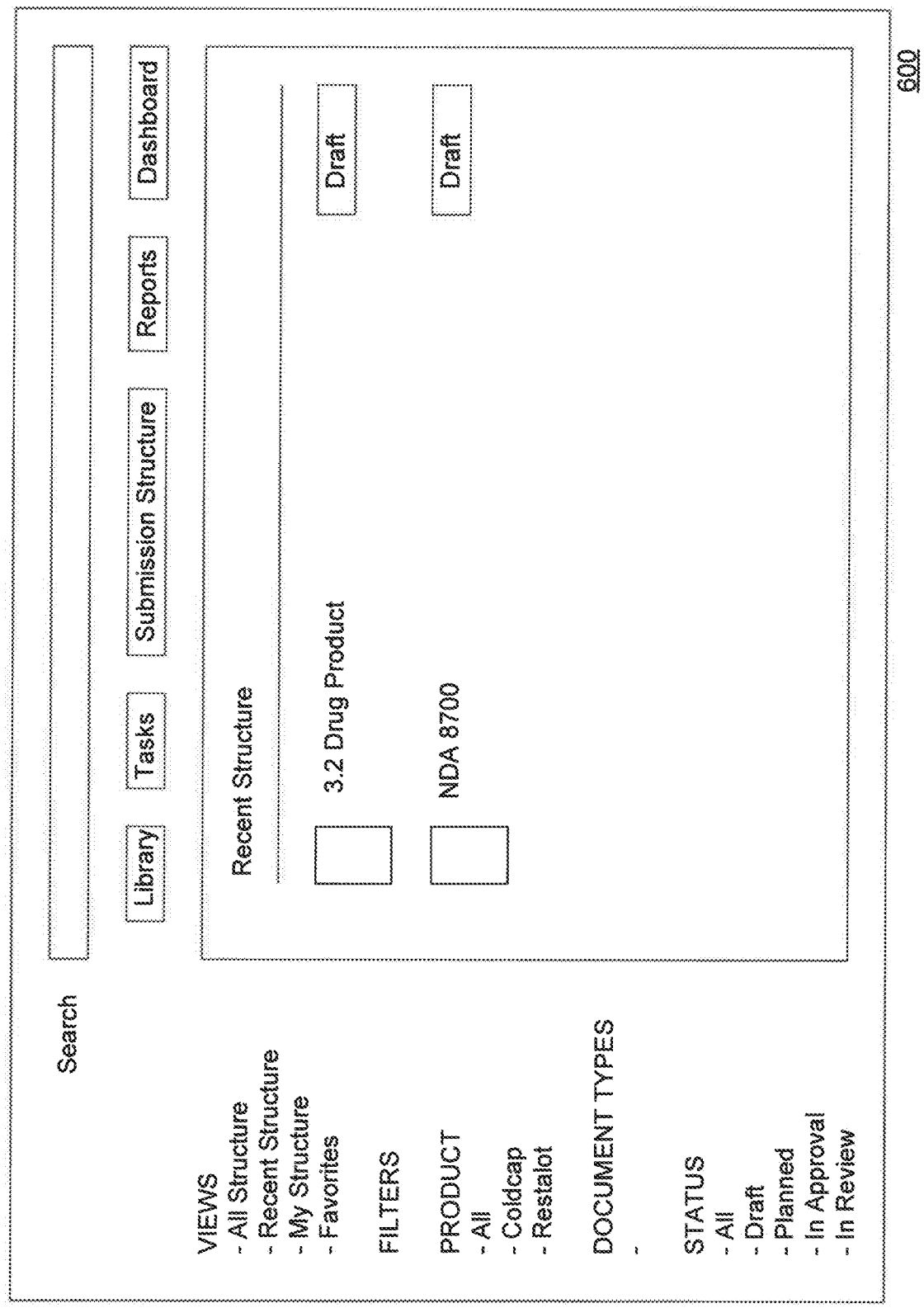
FIG. 6 illustrates an example submission structure user interface according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The regulatory information management module 114 may be stored in the system memory 1122. The regulatory information management module 114 may have a submission controller 1141, a registration controller 1142 and a submission archive controller 1143.

The submission controller 1141 may generate a submission user interface 400 for the user to search the submission library. The user may find information he is looking for (e.g., a drug documentation related to a product) through searching via a search window 401, or filtering via filters 402. The user may also search for information specific to a geographic region, e.g., by selecting My Local View. The user interface 400 may have a window 410 for displaying documents based on the search result. In one implementation, submission is based on the drug information association ("DIA") reference model, and the reference model classification is built based on the latest DIA standards.

When the user clicks on a Task tab 410 on the user interface 400, a task user interface 500 may be displayed, and the user may work on his/her tasks, e.g., participating review and approval flow works.

The submission controller 1141 may also manage submission structures (e.g., a New Drug Application ("NDA") submission structure, or a Biological License Application ("BLA") submission structure). When the user clicks on the Submission Structure tab 420 on the user interface 400, a submission structure interface 600 may be displayed. One or more submission structures may be shown on the submission structure interface 600, e.g., an NDA.

If the user selects one of the submission structures, e.g., NDA 8700, a user interface 700 for that submission structure may be displayed, which may include the hierarchy of the documentation, e.g., Administrative Information, Common Technical Document Summaries, Quality, Nonclinical Study Reports, and Clinical Study Reports. The submission structure may serve as materials for the submission. The submission structure may include placeholder documentation for expected documents, and link documents from repositories in the content storage system 111 directly into the submission structure. In one example, the user may want to add a clinical overview from the existing set of documentation. He may search for it in the content storage system 111 and drag it to the submission structure. The user may also add a link or reference of content from other repositories directly into the structure.

Figure 8:
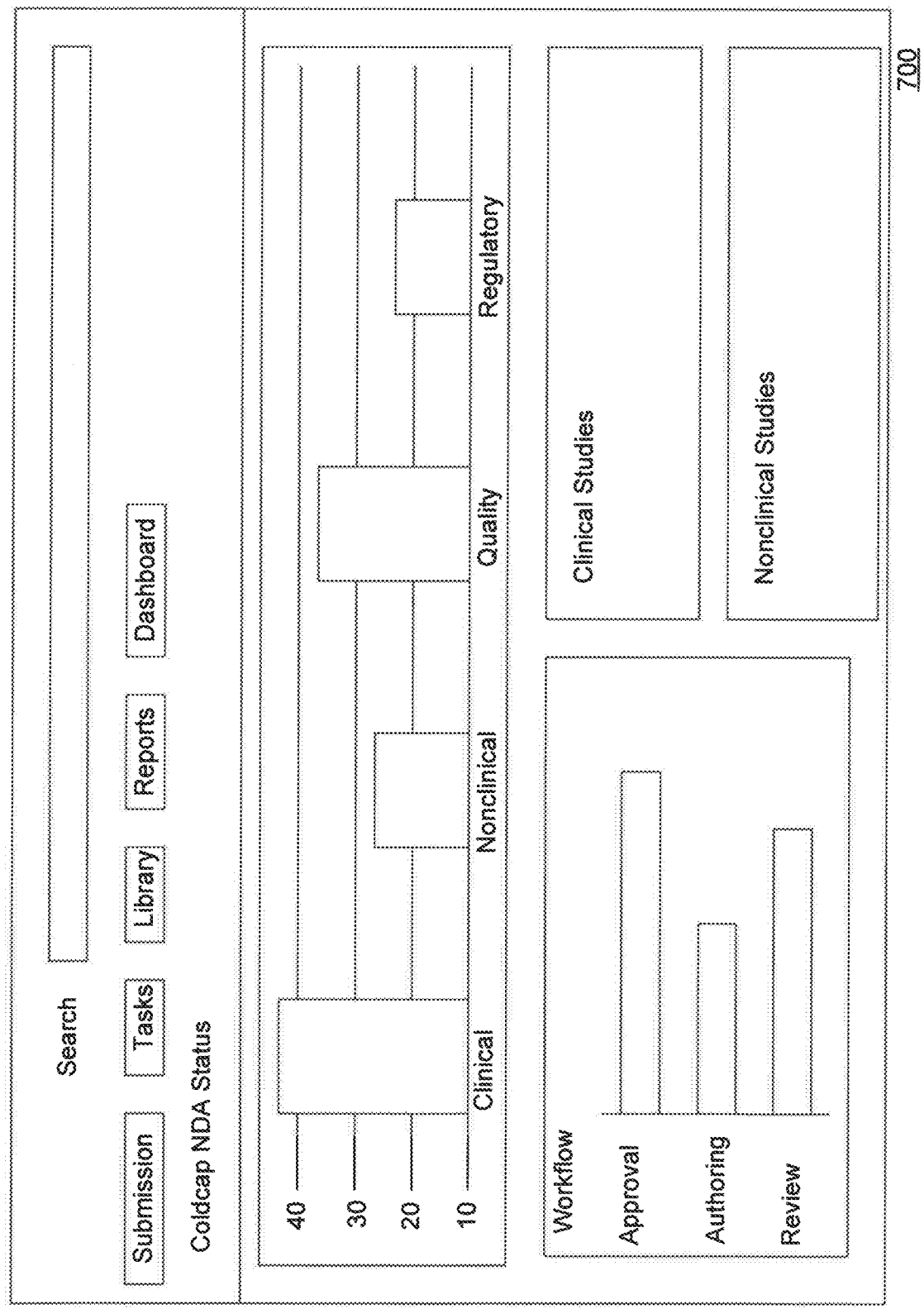
FIG. 8 illustrates an example dashboard report user interface according to one embodiment of the present invention.

Through the process of structure assembly and management of content, the submission controller 1141 may also provide dashboard reports to give users the ability to manage the overall process through structure assembly and management of the content. As shown in FIG. 8, the dashboard report may include current status of the NDA filing, in terms of documentation, a quick look of the status of the documents, each major module, as well as any workflows. From the dashboard, users may click into any of the wedges, and be taken to the report results. From the report results, users may take actions on the documents themselves.

The registration controller 1142 may provide a powerful tool for getting visibility to global registration information, and take actions on regulatory events. All tied seamlessly with various information and functions provided by the content management system 110. The registration controller 1142 may manage registration, product and application information to help customers to make informed decisions about their business. The registration controller 1142 may display registration, product and application information on a user interface 900. If a user wants to understand the global footprint of a product Coldcap, he may click on the Report button on the user interface 900. The user interface 1000 may be presented, displaying global registrations and their status in one report. The reports are actionable, allowing users to drill in a specific registration, e.g., the AU Coldcap 390 registration. The registration record may provide key information including the register information, the associated product information, application date, and key registration dates. The registration record may be displayed on a separate user interface. Information in the registration record may be based on the IDMP data model. The registration controller 1142 may display a user interface for receiving product registration information and updates. The registration controller 1142 may further provide a comprehensive ability to not only capture and view regulatory data, but also take actions when an event occurs, including the ability to assess the impact of change, and manage global response to such change.

In addition to provide registration information, the registration controller 1142 may allow users to take actions on the regulatory business. Users may initiate an action through an event (e.g., update the Coldcap shelf life to 30 months), and assign activities to that event. The activities may be acted on by regulatory personnel that are responsible for a market. Activities may include submission responses. The user can also view the associated submission to address the activity.

Users may trace an actual submission binder representing the submissible content managed in submission library. User may also see key related content and data, such as correspondence and commitment made by the basis for the submission.

The registration controller 1142 may provide powerful, cloud based capabilities to manage product registration information and health authority interactions globally, and robust abilities to capture, view and take actions upon product registrations. It may track bidirectional interactions with health authorities globally, including correspondence, commitments and queries. With the related data features of the content management system 110, it may relate actions to be taken to product registrations. Since it is cloud based, it may tear down the virtual walls that often exist between centralized regulatory teams and their affiliates. Typically, the registration controller 1142 allows users at local sites to access and capture data related to their registration, while have visibilities into and collaborate with teams globally.

In one implementation, the registration controller 1142 is based upon the new Identification of Medicinal Products ("IDMP") data standard for product data, and can support an interface that allows regulatory groups to standardize their registration data, while also make it easy to interface with other software applications.

The registration controller 1142 may help to improve data quality, and make it easy to collaborate with global partners, affiliates and authorities, while reducing duplication and discrepancies by providing a single centralized depository for capturing and sharing regulatory data. The registration controller 1142 may also provide robust reporting and dashboard, and make it easy to report on, and visualize key data points, such as marketing status, registration details and marketing details.

The submission archive controller 1143 may provide a powerful, cloud based capability to access a complete history of regulatory submissions and correspondence globally, with an easy to use interface. From the upload and view perspective, the submission archive controller 1143 may provide electronic common technical document ("eCTD"), non-eCTD electronic, paper and PDF submissions. With the powerful search and filter capabilities of the content management system 110, the submission archive controller 1143 may make document and data search fast and easy. Upon import, all navigation within and outside of documents is rendered to be fully navigable in the content management system 110, making it easy to follow references. In addition, there is a built-in viewer. For eCTDs, it allows users to view submissions in a current view, sequentially, or as cumulative document views.

The submission archive controller 1143 works globally. Given that it is cloud based, it may provide a centralized archive for sharing global filings across the enterprise without requiring any additional software. In addition, with its powerful, easy to use searching and filtering capability, the submission archive makes it easy to find previously submitted information, in order to respond quickly to internal and external queries.

Figure 12:
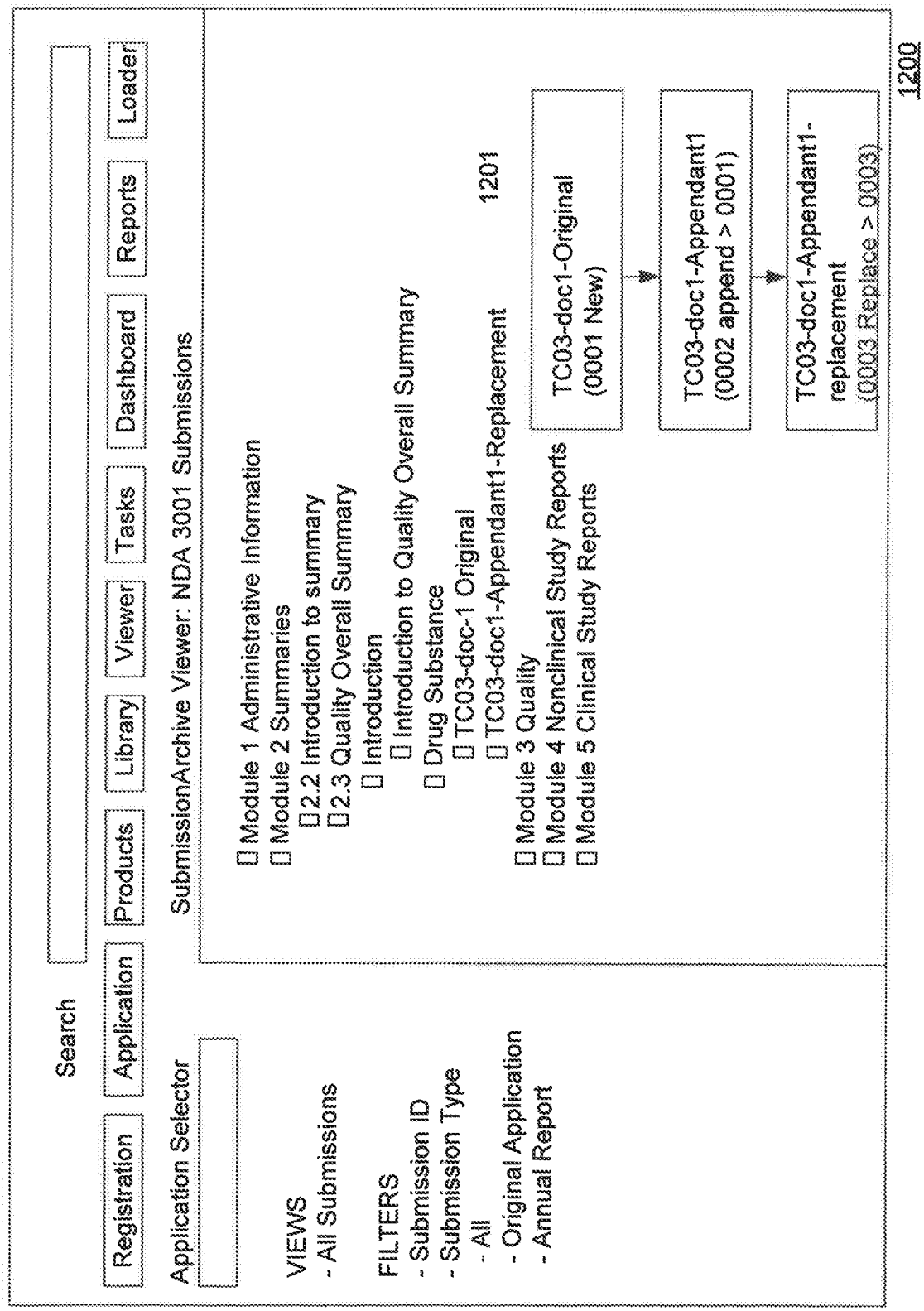
FIG. 12 illustrates an example submission archive user interface according to one embodiment of the present invention.

The submission archive controller 1143 may assist the process from submission planning to content authoring and publishing, by storing and viewing published output. The submission archive controller 1143 may display user interfaces in FIG. 11 and FIG. 12 for users to search and see the previously submitted information. As shown in FIG. 11, users can navigate to the viewer tab and select the application to view. Through the viewer, the user and navigate to published output, and get information on published facts. For a summary document, users can see published info from the backbone, and also historical context, as shown in FIG. 12. Users can view the output the content management system 110, and use the native navigation of the document, including bookmarks and cross document hyperlinks.

In previous solutions, published output resides on uncontrolled file drives, disconnected from the source content. The submission archive controller 1143 addresses the need to securely map published output while providing global accessibility by storing the published output and allowing users to access the published output.

In one implementation, the regulatory information management system may use the same data model for data objects for submission, product registration, submission archive, and source document management, and share data (e.g., product information and manufacturer information) among these functions, so as to avoid duplicate data entry, management and tracking. Health authorities define data requirements, and the regulatory information management system may provide information about the health authority data requirements. Customers may decide the data and documents to submit based on the information about the health authority data requirements, depending on the type of the submission. An example data model for Product is shown below. The bolded names are the objects in the system, in italics are the actual names of the records.

---

Product—Cold medicine (this is a generic name)
   Drug Products
      DP1—Coldcap A (this is the marketed name)
      Product Details (this is how it's sold. Each one of these could be manufactured by a different manufacturer, and could contain different active substances or inactive ingredients)
         45 mg vial
         45 mg tablet
         90 mg vial
         90 mg tablet
      DP2—Coldcap B
      Product Details
         30 mg capsule
         60 mg capsule

---

The system of the present invention unites contributors, partners, and affiliates in the cloud with a single destination for regulatory documents. Global and regional submission dossiers harmonize planning and provide real-time visibility into submission readiness. Globalizing processes becomes substantially easier with a single authoritative source for submissions content. Global alignment may maintain greater control over the distribution and tracking of documents that affiliates submit to local authorities. The system may track the progress of documents through actionable reports and dashboards, mitigating risks to submission timelines, and enabling continuous visibility of the documents. The system may eliminate manual processing to speed submission assembly and improve SOP compliance and speed to market globally. It may automate tracking and reporting by authoring, exchanging, and assembling documents directly within the content management system 110.

In practice, a submission may include hundreds of documents, and there is often reuse in submissions across documents and submission structures. Different versions of the documents may be submitted to authorities in different regions, and they may have different statuses including submitted, superseded, approved, rejected and withdrawn. For example, version 1 of a particular document is submitted to Norway, version 2 of the document is submitted to the U.S. and is approved, and version 3 of the document is submitted to Malaysia and is rejected. There are usually multiple changes and multiple submissions in product reports, in regions, both at the submission level and individual document level. It is often difficult to see the statuses of the documents across the regions. Thus, it is desirable to provide a method and system to help the pharmaceutical companies to find out the submitted documents, their versions and statuses in each region.

The system and method of the present invention may collect submission data of documents in all markets/regions in one system and report on the context of use. Documents may be tagged with metadata that defines the scope of use, e.g., product and product substance. Submission content may be organized into a submission structure for planning and tracking. Submission content may be matched to submission structure automatically based on metadata to allow for re-use of the submission content regardless of the submission format. The submission structure may be linked to regulatory objective information. Registration data may track status of regulatory objectives in each market/region. Reporting across all entities may bring together a view of currently approved content in all markets.

A number of types of documents and data may be involved in the submission. Source documents, the documents being written and authored (e.g., a Word document), can be general documents shared across the region which describe the product as a whole. Regional content could be content that is specific to a region (e.g., Europe). Published output may include the actual published output after the submission is formed and authored when all documents meet authority requirements and are ready to be published. Registration data may include data about a registration including related products actually licensed for use in that particular country.

Figure 13A:
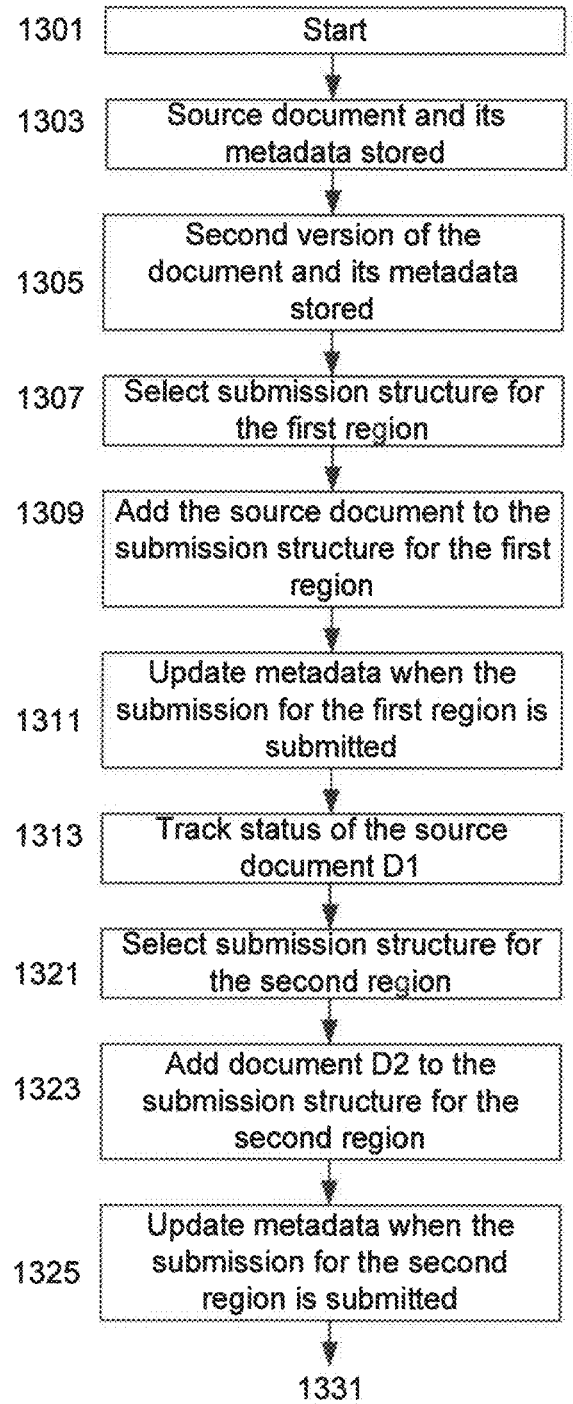
FIGS. 13A and 13B illustrate a flowchart of a method for managing document variations in submissions with the regulatory information management architecture according to one embodiment of the present invention.
Figure 13B:
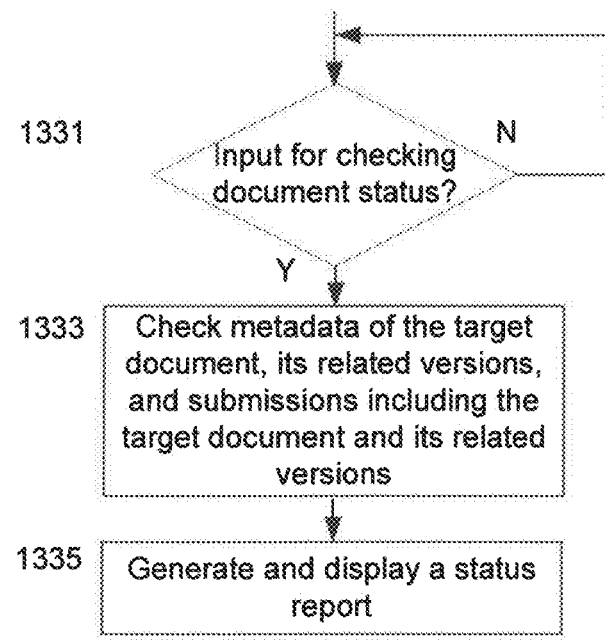

FIGS. 13A and 13B illustrate a flowchart of a method for managing document variations in submissions with the regulatory information management architecture according to one embodiment of the present invention. The process may start at 1301.

At 1303, a source document D1 may be stored to the repository 111a. The source document may be drafted in the architecture 100 (e.g., with the user computing device 120b), or drafted in another system and uploaded to the architecture 100. Some metadata may be collected and stored together with the source document D1, and may include the product, the version of the document and its submission status (e.g., not-submitted). In one example, the source document may be tagged with metadata that define the scope of use, e.g., the product substance. Other metadata may be included, depending on the type of document. It could also be related, for example, to a particular clinical study, active substance or a form strength of the product.

At 1305, the source document D1 may be updated to D2, and stored to the repository 111a. Metadata may be stored together with the document D2, and may include the product, the version of the document and its submission status (e.g., not-submitted).

At 1307, a user input for selecting a submission structure for a first region may be received at the submission controller 1141, and the submission structure for the first region may be selected in response. In one example, the submission structure may be linked to regulatory objective.

At 1309, the source document D1 may be added to the selected submission structure for the first region. The source document D1 may be added by being dragged to the selected submission structure for the first region by a user, by being linked from the content storage system 111 to the selected submission structure for the first region, or by being automatically matched to the selected submission structure for the first region based on the metadata of the source document D1 and that of the submission structure for the first region. In one example, the source document D1 may be automatically matched to the submission structure for the first region based on the product name in the metadata of the source document D1 and the metadata of the submission structure for the first region by the submission controller 1141.

In one embodiment, the ties between the documents may be built up through a content plan. The content plan may automatically match the content to the submission structure based metadata. The metadata can be, e.g., the type of documents, the product, and the product substances. Multiple different attributes may be used to match the documents to a new submission.

Each submission may have its own content plan, and each content plan may have documents automatically matched to it. The content plan may have a number of content plan items and each content plan item may represent the metadata about the context of use of the document within the particular submission. A matched document may be located by checking content plan items against the representation of the document in the structure.

In one embodiment, the document may be matched to a content plan based on certain matching fields, certain attributes that exist on the document details and also exist on the content plan. The submission controller 1141 may check the matching fields and tries to match the document to the content plan, e.g., based on type, sub-type, classification of the document, submission and application.

At 1311, when the submission for the first region is submitted, the metadata of the document D1 in the submission for the first region may be updated. In addition to the product and the version of the document, the metadata may also include the first region, date of the submission, and the user who submitted the submission, active substance, clinical study, application or any other data element relevant to this particular type of document. Subsequently, its submission status may be changed to submitted.

Registration is the approval to sell a product in a particular market or region. Registration may come after multiple submissions when regulatory objectives are met. Some submissions may have hundreds of documents for the purpose of registering one product in a particular market/region. A submission is market specific, but documents are not necessarily market specific, and could be reused across multiple submissions. Registration data may track status of the regulatory objective in each region, if they are approved, rejected, or withdraw. Registration data may include information about the registration, e.g., registration name, country, status of approval, and license information.

The status of the document D1 may change over the lifecycle of the submission, e.g., from submitted, to rejected, superseded, withdraw and approved. The submission controller 1141 may continuously track the status of the source document D1 through the lifecycle of the submission at 1313.

At 1321, a user input for selecting a submission structure for a second region may be received at the submission controller 1141, and the submission structure for the second region may be selected in response.

At 1323, the document D2 may be added to the selected submission structure for the second region. The source document D2 may be added by being dragged to the selected submission structure for the second region by a user, by being linked from the content storage system 111 to the selected submission structure for the second region, or by being automatically matched to the selected submission structure for the second region based on the metadata of the document D2 and that of the submission structure for the second region.

At 1325, when the submission for the second region is submitted, the metadata of the document D2 in the submission for the second region may be updated. In addition to the product and the version of the document, the metadata may also include the second region, date of the submission to the second region, and the user who submitted the submission, and its submission status may be changed to submitted.

The status of the document D2 and other documents in the submission may change over the lifecycle of the submission, e.g., from submitted, to rejected, superseded, withdraw and approved. The submission controller 1141 may continuously track the statuses of the document D2 and other documents in the submission through the lifecycle of the submission at 1327.

The user may want to check the overall status of the submission, and the status of a specific document in the context of that submission. At 1331, a user input for checking status of a target document, e.g., the document D2, may be received.

At 1333, the submission controller 1141 may check metadata of the document D2, metadata of all version of the document D2, including its older versions (e.g., D1) and newer versions, and metadata of the submissions including each version of the document D2, including the submission for the first region, and the submission for the second region.

At 1335, a report of statuses of all versions of the target document may be generated based on the metadata of all versions of the target document and the submissions including each version of the target document. As shown in FIG. 14, the report may have the status of each version of the target document, including different statuses of it based on the market/region and the submission that it is in. The report may show the relationships between different documents based on metadata to provide users the context of views of documents with a particular market and a particular time. Specifically, the submission in the first row used version 2.0, the initial MAA (Marketing Authorization Application, the main type of application in the EU), which is superseded. Its submission is approved and its registration in European Union is also approved. The submission in the second row used version 3.0, the updated specification, which is superseded. Its submission is approved and its registration in European Union is also approved. The submission in the third row used version 4.0, the updated specification, which is superseded. Its submission is approved and its registration in European Union is also approved. All the rows are based on the same source document, and the user can see the statues of all its versions and the statues of the submissions including each version.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. For example, a submission structure may be selected before documents are stored. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A system for managing regulatory information, comprising:
    a submission controller for:
        generating a submission user interface which comprising a first area for receiving a first query for a first document; a second area for receiving a request for a submission structure for a first submission, a third area for receiving a request for a first task, and a fourth area for displaying a search result in response to the first query;
        in response to the request for the submission structure for the first submission, displaying the submission structure for the first submission, wherein the submission structure for the first submission comprises a hierarchy of documentation of the first submission;
        in response to the first query, searching a content and data management system for the first document, and displaying a search result in the fourth area;
        in response to a request for adding the first document to the submission structure for the first submission, adding the first document to the submission structure; and
        storing metadata of the first document to the content and data management system, and
    a registration controller for displaying a user interface for receiving product registration information.

2. The system of claim 1, wherein the submission controller further:
    in response to a second query, searches the content and data management system for a second document,
    obtains a link pointing to the second document in the content and data management system, and adds the link to a place for the second document in the submission structure for the first submission.

3. The system of claim 1, wherein the submission structure for the first submission further comprises: a placeholder for a third document.

4. The system of claim 3, wherein the submission controller further:
 in response to a third query, searches the content and data management system for a third document;
 displays the third document in the fourth area, and
 adds the third document to the placeholder in the submission structure for the first submission.

5. The system of claim 1, wherein the submission controller further: searches the content management system for a fifth document based on a selected filter.

6. The system of claim 1, wherein the registration controller further:
 displays a registration user interface which comprises an area for receiving a request for a report; and
 displays a report user interface in response to the request for the report, wherein the report use interface comprises a first product registration and its status.

7. The system of claim 1, wherein the registration controller further: displays a registration record which provides product information, and key registration dates.

8. The system of claim 1, wherein the registration controller further: tracks bidirectional interactions with a health authority.

9. The system of claim 1, wherein the registration controller further: relates actions to be taken to a product registration based on data in the content and management system.

10. The system of claim 1, further comprising: a submission archive controller for displaying a submission archive user interface to enable access to previously submitted information.

11. The system of claim 10, wherein the submission archive user interface further enables access to correspondence related to the submission.

12. The system of claim 1, further comprising: a submission archive controller for displaying a submission archive user interface to enable access to previously submitted information and correspondence related to the submission.

13. A regulatory information management system, comprising:
 a submission controller for:
  generating a submission user interface which comprising a first area for receiving a first query for a first document; a second area for receiving a request for a submission structure for a first submission, a third area for receiving a request for a first task, and a fourth area for displaying a search result in response to the first query;
  in response to the request for the submission structure for the first submission, displaying the submission structure for the first submission, wherein the submission structure for the first submission comprises a hierarchy of documentation of the first submission;
  in response to the first query, searching a content and data management system for the first document, and displaying a search result in the fourth area;
  in response to a request for adding the first document to the submission structure for the first submission, adding the first document to the submission structure;
  storing metadata of the first document to the content and data management system; and
  generating a task interface in response to a request, wherein the task interface comprises a task in progress, and
 a registration controller for
  displaying a user interface for receiving product registration information;
  displaying a registration user interface which comprises an area for receiving a request for a report; and
  displaying a report user interface in response to the request for the report, wherein the report user interface comprises a first product registration and its status.

14. The system of claim 13, wherein the registration controller further: displays a registration record which provides product information, and key registration dates.

15. The system of claim 13, wherein the registration controller further: tracks bidirectional interactions with a health authority.

16. The system of claim 13, wherein the registration controller further: relates actions to be taken to a product registration based on data in the content and management system.

17. The system of claim 13, further comprising: a submission archive controller for displaying a user interface to enable access to previously submitted information and correspondence related to the submission.

18. A system for managing regulatory information, comprising:
 a submission controller for:
  generating a submission user interface which comprising a first area for receiving a first query for a first document; a second area for receiving a request for a submission structure for a first submission, a third area for receiving a request for a first task, and a fourth area for displaying a search result in response to the first query;
  in response to the request for the submission structure for the first submission, displaying the submission structure for the first submission, wherein the submission structure for the first submission comprises a hierarchy of documentation of the first submission;
  in response to the first query, searching a content and data management system for the first document, and displaying a search result in the fourth area;
  in response to a request for adding the first document to the submission structure for the first submission, adding the first document to the submission structure;
  storing metadata of the first document to the content and data management system, and
  generating a dashboard user interface in response to a request, wherein the dashboard user interface comprises a status of a task.

\* \* \* \* \*